(12) United States Patent
Hoogzaad et al.

(10) Patent No.: US 8,319,449 B2
(45) Date of Patent: Nov. 27, 2012

(54) CONTROLLED VOLTAGE SOURCE FOR LED DRIVERS

(75) Inventors: Gian Hoogzaad, Mook (NL); Antonius M. G. Mobers, Grave (NL)

(73) Assignee: NXP B.V., Eindhoven (NL)

( * ) Notice: Subject to any disclaimer, the term of this patent is extended or adjusted under 35 U.S.C. 154(b) by 286 days.

(21) Appl. No.: 12/517,275

(22) PCT Filed: Dec. 3, 2007

(86) PCT No.: PCT/IB2007/054895
§ 371 (c)(1),
(2), (4) Date: Jun. 2, 2009

(87) PCT Pub. No.: WO2008/068705
PCT Pub. Date: Jun. 12, 2008

(65) Prior Publication Data
US 2010/0019693 A1    Jan. 28, 2010

(30) Foreign Application Priority Data
Dec. 6, 2006 (EP) .................................. 06125476

(51) Int. Cl.
*H05B 37/02* (2006.01)
*G09F 3/32* (2006.01)

(52) U.S. Cl. .................. 315/291; 315/297; 315/185 S; 315/312; 315/247; 345/82; 345/102

(58) Field of Classification Search ............... 315/185 S, 315/220 A, 246–247, 224–225, 209 R, 291, 315/297, 307–326; 345/82, 102, 204, 207, 345/211–214
See application file for complete search history.

(56) References Cited

U.S. PATENT DOCUMENTS

| | | | | |
|---|---|---|---|---|
| 7,202,608 | B2 * | 4/2007 | Robinson et al. | 315/224 |
| 7,358,681 | B2 * | 4/2008 | Robinson et al. | 315/224 |
| 7,358,685 | B2 * | 4/2008 | Lee | 315/287 |
| 7,420,335 | B2 * | 9/2008 | Robinson et al. | 315/224 |
| 7,583,035 | B2 * | 9/2009 | Shteynberg et al. | 315/307 |
| 7,843,150 | B2 * | 11/2010 | Wang et al. | 315/307 |
| 2003/0235062 | A1 | 12/2003 | Burgyan et al. | |
| 2006/0001381 | A1 * | 1/2006 | Robinson et al. | 315/185 R |
| 2009/0021182 | A1 * | 1/2009 | Sauerlaender | 315/291 |
| 2009/0134817 | A1 * | 5/2009 | Jurngwirth et al. | 315/307 |
| 2009/0179589 | A1 * | 7/2009 | Buhler et al. | 315/297 |
| 2010/0026191 | A1 * | 2/2010 | Radermacher et al. | 315/149 |

FOREIGN PATENT DOCUMENTS

| | | |
|---|---|---|
| DE | 100 13 216 A1 | 9/2001 |
| DE | 100 40 154 A1 | 3/2002 |
| WO | 2006/097329 A | 9/2006 |

OTHER PUBLICATIONS

Maxim; "480mA White LED 1x/1.5x12x Charge Pump for Backlighting and Campera Flash"; 2005; Sunnyvale, CA, USA; XP002475922.

* cited by examiner

*Primary Examiner* — Vibol Tan

(57) ABSTRACT

The present invention relates to an electronic device for driving a light emitting semiconductor device, which includes controlling means (CNTL) being adapted for controlling a switch mode power supply for supplying the light emitting semiconductor device in response to a sensing value received by the controlling means which is indicative of a voltage across a current source for determining a current through the light emitting semiconductor device, wherein the switch-mode power supply is controlled such that the voltage across the current source is minimum.

18 Claims, 10 Drawing Sheets

CONTROLLED VOLTAGE SOURCE FOR LED DRIVERS

FIELD OF THE INVENTION

The present invention relates to an electronic device for driving a light emitting diode, more specifically to a control mechanism for an electronic device for driving a light emitting diode. The invention further relates to a system comprising the electronic device and the light emitting diodes, and a method of driving the diodes.

BACKGROUND OF THE INVENTION

Light emitting diodes are to be driven at a constant current. Linear current sources are broadly used for this purpose, as they are cheap and highly accurate. Further, the linear current sources can be switched on and off quickly, a characteristic being advantageous for implementing pulse width modulation (PWM) dimming. Amplitude modulation (AM) dimming is also easy to implement by linear current sources, wherein different current levels or current digital-to-analog converters are used. Typically, linear current sources are used in one dimensional (1D) and two dimensional (2D) dimmable backlight systems, since many independent current sources are required in those applications. Another approach consists in switch-mode solutions, which is, however, more expensive, but less power consuming. Linear current sources used for driving LED strings have only limited power efficiency, which is mainly due to voltage variations of the LEDs. These voltage variations find their origin in temperature dependence, spread, and aging. If a fixed voltage supply is used for driving the light emitting diodes of a string, the current sources being coupled in series to the LED strings may experience a large voltage. The large voltage entails a large power dissipation, which in turn requires the current sources to be suitable to withstand high temperatures. Accordingly, design considerations are to be made, which result in more devices and packages in parallel, additional heat sinking mechanisms, and generally, in a substantial increase in costs.

SUMMARY OF THE INVENTION

It is an object of the present invention to reduce the power consumption due to voltage variations of the light emitting semiconductor device.

According to a first aspect of the present invention, an electronic device for driving a light emitting semiconductor device is provided which includes controlling means adapted for controlling a switch mode power supply for supplying the light emitting semiconductor device in response to a sensing value received by the controlling means which is indicative of a voltage across a current source for determining a current through the light emitting semiconductor device, wherein the switch-mode power supply is controlled such that the voltage across the current source is minimum. Although the following description relates mainly to light emitting diodes as light emitting semiconductor devices, the present invention covers all kinds of light emitting semiconductor devices, which may be driven by the same or similar mechanisms as described here below. According to this aspect of the present invention the electronic device provides means to control a switch-mode power supply in response to the voltage across a current source that is e.g. coupled in series to the light emitting diode. Accordingly, the control mechanisms of power supply and current source are coupled to each other such that the power supply is adjusted in accordance with the voltage drop across the current source. If current source and voltage supply were controlled independently as provided by prior art solutions, the current through an LED is held constant by the current source as long as the light emitted by the LED satisfies the specific requirements as brightness or color. However, if the forward voltage across the LED, or even worse across a string of LEDs, varies during operation, the supply voltage provided by the controlled power supply may by higher than necessary. Any additional voltage drop across the current source produces undesirable power losses by way of heat. This aspect of the present invention takes account of this problem by providing a control mechanism that reduces (or increases) the supply voltage such that the voltage across the current source remains at a minimum voltage being just necessary to assure proper operation without producing any excess voltage across the current source, which would be turned into heat. The current source may be implemented as a linear or a switched current source being preferably controllable to provide an appropriate current through a single or through multiple LEDs. A current source in the present context, is to be understood as encompassing current sources or current sinks. The current source may be implemented by a current mirror, wherein one transistor is coupled in series with one or more light emitting diodes (e.g. a string of diodes). As the current source (or current sink) is dimensioned and biased for a specific current, any deviation from the predetermined value for the current will cause significant variations in the voltage across the transistor. The control mechanism according to the present invention allows to control the output voltage (and/or current) of the switch-mode power supply (such as switch-mode power converter as buck-buck-boost or boost converter) in accordance with a minimum voltage drop across the current source. The minimum voltage drop is the voltage that is required to operate the current source, as for example a current mirror, in saturation. To provide an appropriate sensing value that is indicative of the voltage drop across the current source, the voltage level at the input of the current source (or sink) may be measured. The so determined value may then be compared to a reference value, which is the minimum value of the voltage drop across the current mirror. Any deviation from the reference value may then be used to control the switch-mode power converter to re-establish the minimum value. However, as apparent for those skilled in the art, the sensing value may be another voltage or current that is suitable to indicate the voltage across the current source.

According to another aspect of the present invention, the electronic device as set out above, includes further the current source, wherein the current source is either a switched current source or a linear current source. The present invention is basically applicable to all kinds of current sources. It is therefore irrelevant whether or not the current source, or at least those components of the current source, which are coupled to the LED, are implemented according to switch mode principles or linear driving mechanisms. As the current source represents a component with a theoretically infinite impedance, the voltage across the current source will take any value necessary to maintain a specific current. If the supply voltage for the LEDs is increased, this may cause additional voltage across the current source, at least across those parts of the current source which are coupled with the LEDs. The present invention overcomes these problems by regulating the supply voltage in relation to the voltage drop.

According to an aspect of the present invention, the electronic device is adapted to switch the current through the LEDs on and off. The switching may in particular occur in response to a pulse width modulated signal. This aspect relates to control mechanisms using rapid pulse width modulated (PWM) signals for controlling the light emission of LEDs. According to this aspect of the invention it is provided that the switching activity of the current through the LEDs is in accordance with the control mechanism according to the above aspects of the present invention. Instead, the control means take account of the switching sequence and adapts the control appropriately in order to avoid any conflict.

According to another aspect of the present invention, the controlling means is further adapted to control the timing of a sample switch for sampling the sensing value, which is indicative of the voltage across the current source, such that the sensing value is sampled in accordance with the timing of switching of the current through the current source. In particular, the sensing value is sampled if the current through the current source is switched on. As switch-mode power converters must be switched according to a specific timing in order to provide an appropriate output voltage, it is necessary to consider this timing for the mechanism of retrieving the sensing value.

According to still another aspect of the present invention the switch-mode power supply and the controlling means are adapted to control the output voltage of the switch-mode power supply with a resolution or control accuracy of less than the variation of the forward voltage of the light emitting diode to be driven. According to this aspect of the invention, the control mechanism, and the switch-mode power supply provide a specific control accuracy, such that the variations of the forward voltage of the light emitting diodes are compensated. If a plurality of light emitting diodes is coupled in a string, this aspect of the present invention relates to the total added variation of the forward voltages of the string. If, for example, a single light emitting diode has a forward voltage variation of several millivolts, this comparatively small value can add up, if multiple LEDs are coupled in series. In this situation, the control range and accuracy take account of the overall variation as well as the smallest possible variation. Generally, the switch-mode power supply, or parts of it may be integrated on the same substrate as the control mechanism described here above with respect to the other aspects of the present invention.

According to another aspect of the invention, the electronic device is further adapted to provide pulse width modulation (PWM) signals for a plurality of strings of light emitting diodes for individually dimming of each of the strings. This aspect of the present invention relates to some typical applications, where a plurality of light emitting diodes is coupled to form a string. The electronic device according to this aspect of the invention is adapted such that these strings may be dimmed individually. This requires that the timing of the control mechanism takes account of the control mechanism described here above.

According to still another aspect of the present invention a plurality of current sources and a minimum selector is provided, wherein the plurality of light emitting diodes (or as mentioned above a plurality of light emitting semiconductor devices) is coupled to the plurality of current sources and the minimum selector is adapted to select the minimum voltage across the plurality of current sources, wherein the selected minimum voltage is used as a reference for controlling the switch-mode power supply. Accordingly, even if a plurality of light emitting diodes, as for example three strings of light emitting diodes are driven by the present electronic device, a mechanism is provided that allows to detect a current source with a minimum voltage drop and to control all strings by the minimum voltage. This reduces complexity of the required circuits.

According to an aspect of the present invention, the control unit is electrically decoupled from the light emitting semiconductor devices (such as light emitting diodes), in particular by an inductive power converter or by an opto-coupler or by both. Accordingly, the present invention relates also to configurations, where the control unit, but also the switched mode power supply is decoupled by means of transformers, opto-couplers, or the like from the light emitting diodes.

According to an aspect of the present invention, an integrated semiconductor device is provided being arranged according to one or several aspects of the present invention, as set out here above. In particular, a integrated semiconductor device according to present invention may provide input and output pins to provide the functionality in accordance with the present invention. According to one aspect of the invention, a integrated semiconductor device, as for example a packaged chip, provides an input pin being configured to receive a sensing value to provide the control functions as described above. The above aspects of the present invention may be combined in any number or configuration.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
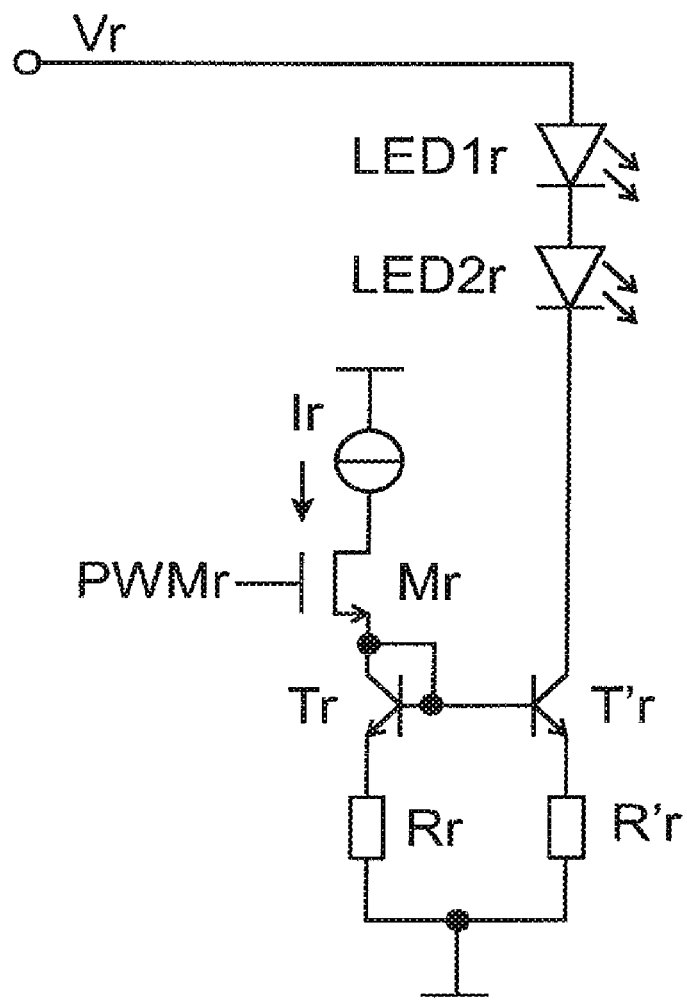
FIG. 1 shows a simplified schematic of a conventional circuitry for driving LEDs of a single string.

FIG. 1 shows a simplified schematic of a conventional driver circuit for driving two light emitting diodes LED1$r$, LED2$r$, as light emitting semiconductor devices. A constant voltage source Vr is coupled to the string of LEDs to supply a current through the LEDs. The appropriate current through the LEDs is determined by the current mirror (used as a current sink in this example) consisting of transistors Tr and T'r. The current mirror is biased by the bias current source with a current Ir. The dimming of the string of LEDs is implemented by pulse width modulated switching of the transistor Mr by a signal PWMr at the gate of transistor Mr. If Mr is turned on, the current mirror of Tr, T'r mirrors the current Ir into the string of LED1$r$, LED2$r$. The resistors Rr and R'r are provided for biasing and stabilizing the current mirror. If the voltage drop across the diodes LED1$r$ and LED2$r$ varies due to temperature, aging, or production spread the voltage drop across the current mirror, in particular across transistor T'r changes, too. Accordingly, instead of being driven at the edge of saturation, i.e. at the minimum voltage, the transistor T'r experiences a greater voltage drop. The consequence is greater power consumption of the current mirror than necessary.

Figure 2:
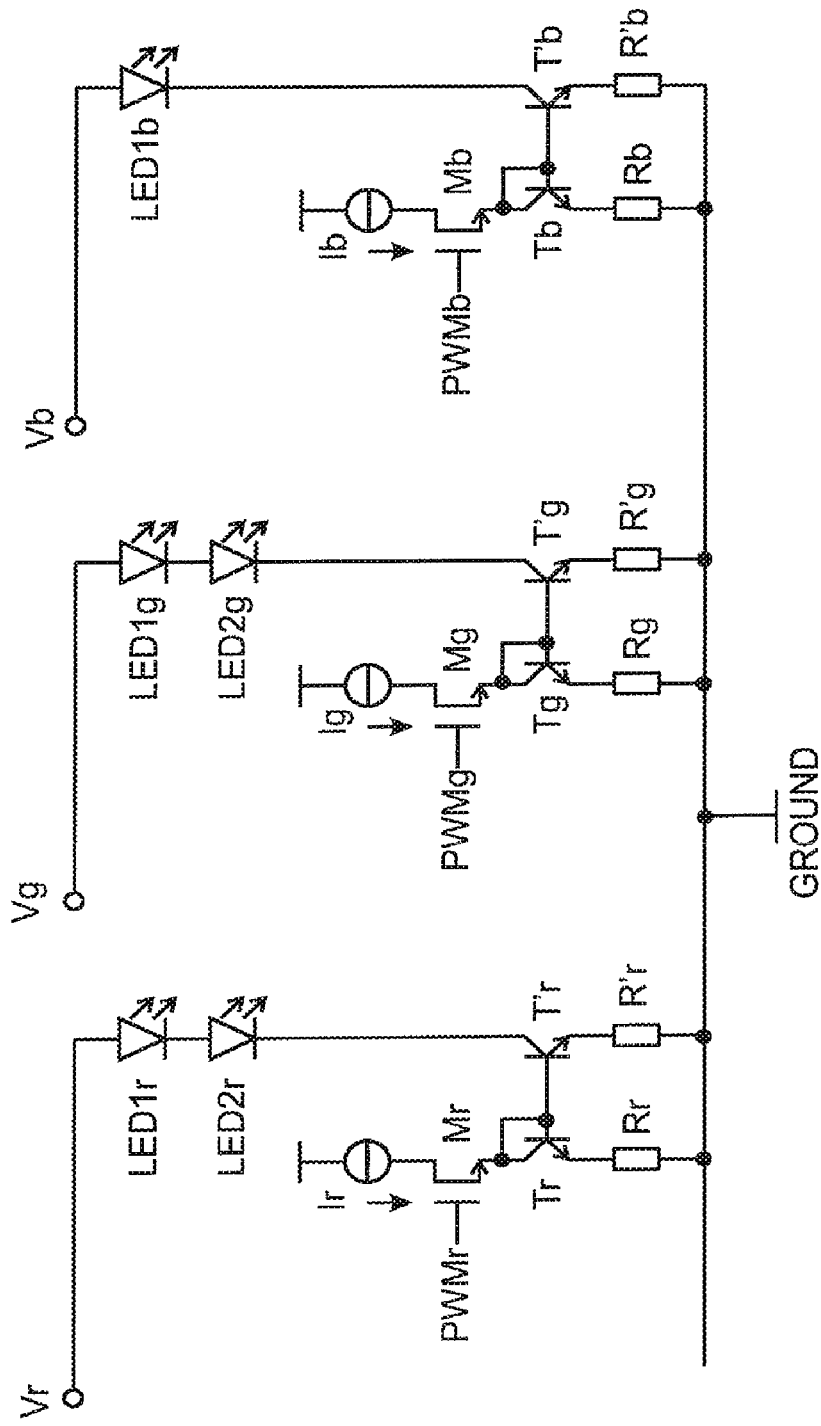
FIG. 2 shows a simplified schematic of a conventional circuitry for driving LED strings of three different colors.
Figure 3:
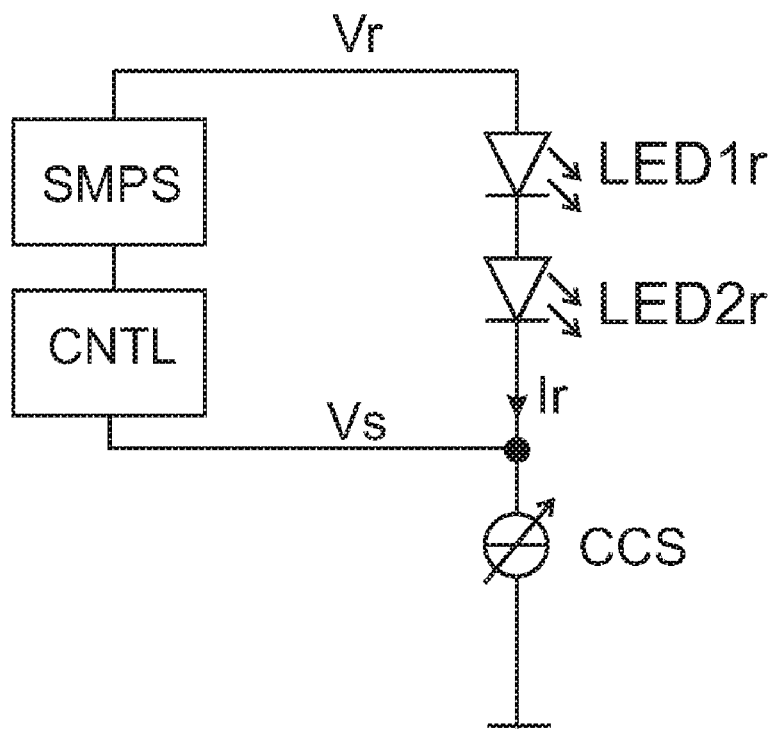
FIG. 3 shows a simplified schematic of a first embodiment of the present invention
Figure 6:
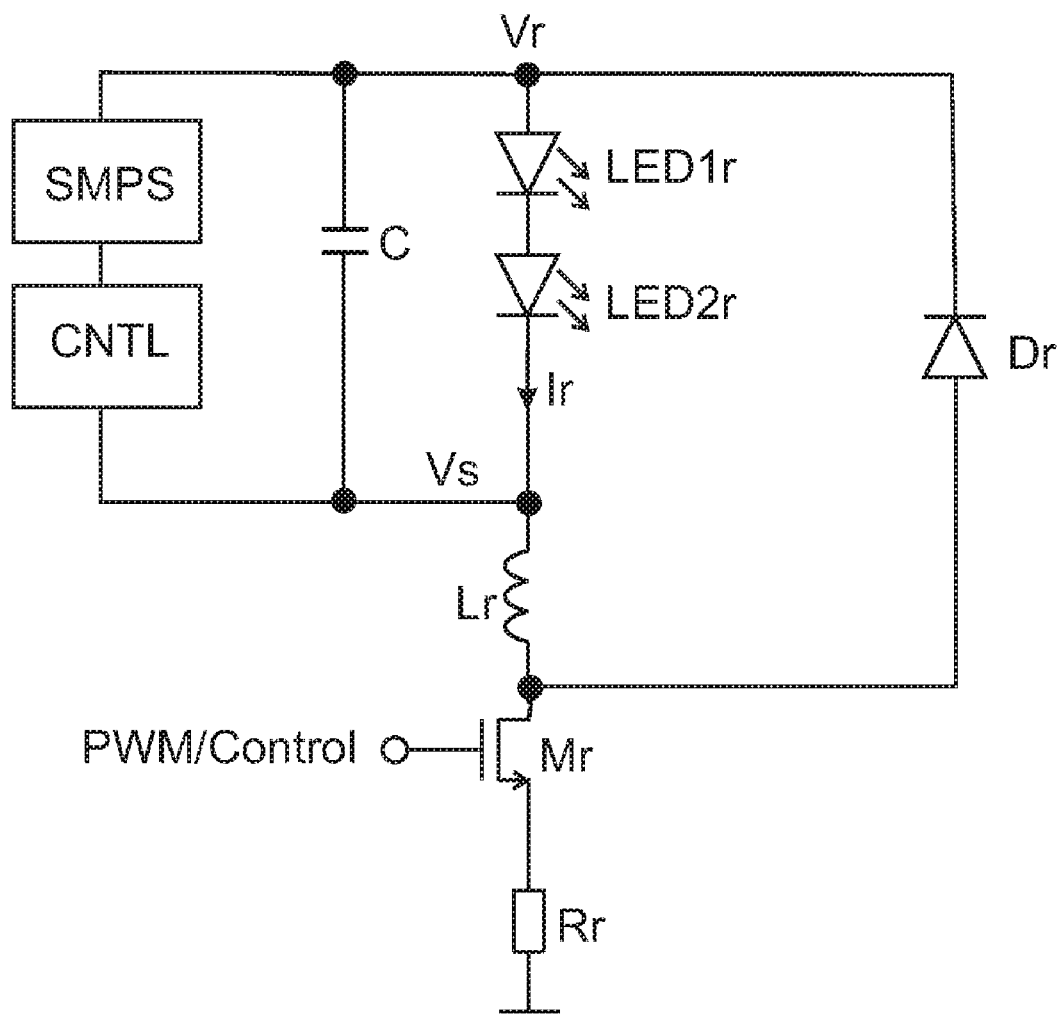
FIG. 6 shows a simplified schematic of a fourth embodiment of the present invention.

FIG. 2 shows a simplified schematic of a conventional circuit for driving LED strings of different color. There are three similar circuits, a first circuit including two red light emitting diodes LED1r, LED2r, a second circuit including two green light emitting diodes LED1g, LED2g, and a third circuit including one blue light emitting diode LED1b. Throughout this application, the number of LEDs in a string is to be understood as being variable, such that a smaller or greater number of LEDs may form a string. There is further a bias current source Ir, Ig, Ib for each of the three circuits and a constant voltage source Vr, Vg, and Vb. The LEDs are coupled to a current mirror consisting of transistors Tr, T'r, Tg, T'g, and Tb, T'b. The bias current sources Ir, Ig, Ib are coupled via MOSFETs Mr, Mg, Mb to the current mirrors. The MOS transistors are individually controlled by pulse width modulated signals PWMr, PWMg, PWMb in order to define the luminance of each of the strings. Typically, the current mirrors provide a specific gain, which allows to reduce the current in the input branch provided by the bias current sources Ir, Ig, Ib, FIG. 3 shows a simplified schematic of a first embodiment of the present invention. The string of LED1r and LED2r is coupled to a switch-mode power supply SMPS and a control unit CNTL. The voltage drop across the controlled current source CCS is sensed and a value Vs, which is indicative of the voltage drop is supplied to the control unit CNTL. The controlled current source CCS may be implemented by a linear or by a switched mode current source. An example for a switched mode implementation is shown in FIG. 6 and will be described here below. However, the controlled current source CCS may be configured to receive a pulse width modulating signal PWM in order to switch the current through the light emitting diodes LED1r, LED2r on and off. This mechanism is used to control the properties of the light emission, such as luminance and color of the LEDs. The control unit CNTL transmits signals to the switch-mode power supply SMPS to control the output voltage Vr. If the voltage drop Vs across CCS is to high the voltage Vr is reduced. If the voltage drop is too small the voltage Vr is increased.

Figure 4:
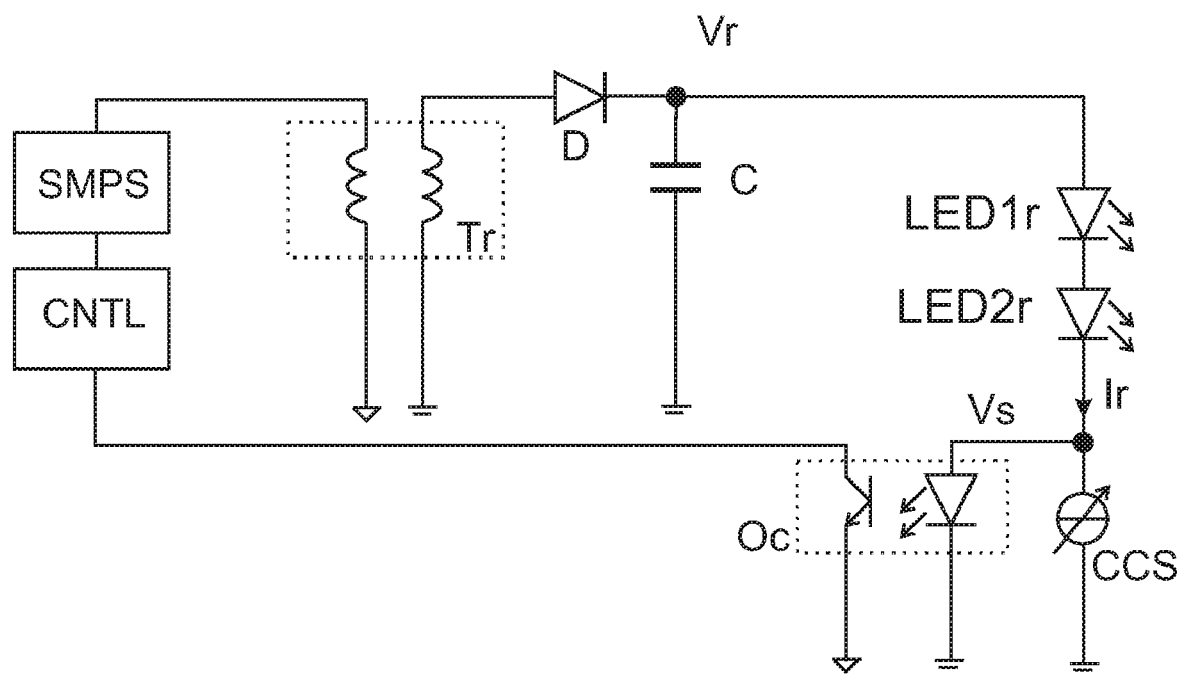
FIG. 4 shows a simplified schematic of a second embodiment of the present invention.

FIG. 4 shows a simplified schematic of an embodiment of an aspect of the present invention. FIG. 4 shows in particular a configuration according to an aspect of the present invention, where the switch mode power supply SMPS and the control unit CNTL are coupled to the LEDs LED1r, LED2r via a transformer Tr. The transformer Tr decouples the light emitting diodes LED1r, LED2r from the power supply. The secondary side of the transformer is, just as an example, coupled to a diode Dr and a capacitor C for rectifying or smoothing the output voltage Vr. The output voltage Vr is finally supplied to the LEDs LED1r, LED2r. The controlled current source CCS provides a current Ir through the LEDs LED1r, LED2r. The voltage drop across the controlled current source CCS is indicated by Vs. The voltage Vs is applied to a light emitting diode being part of an optocoupler OC. The optocoupler OC transmits the sensing voltage Vs, i.e. a corresponding value, which is indicative of the voltage drop across the controlled current source CCS to the control unit CNTL. As apparent from FIG. 4, the driving mechanism and the control mechanism disclosed with respect to various aspects of the present invention may all be implemented by use of a decoupling (or isolating) mechanism as shown in present FIG. 4. Decoupling (or isolating) as shown in FIG. 4 might be particularly useful for numerous applications.

Figure 5:
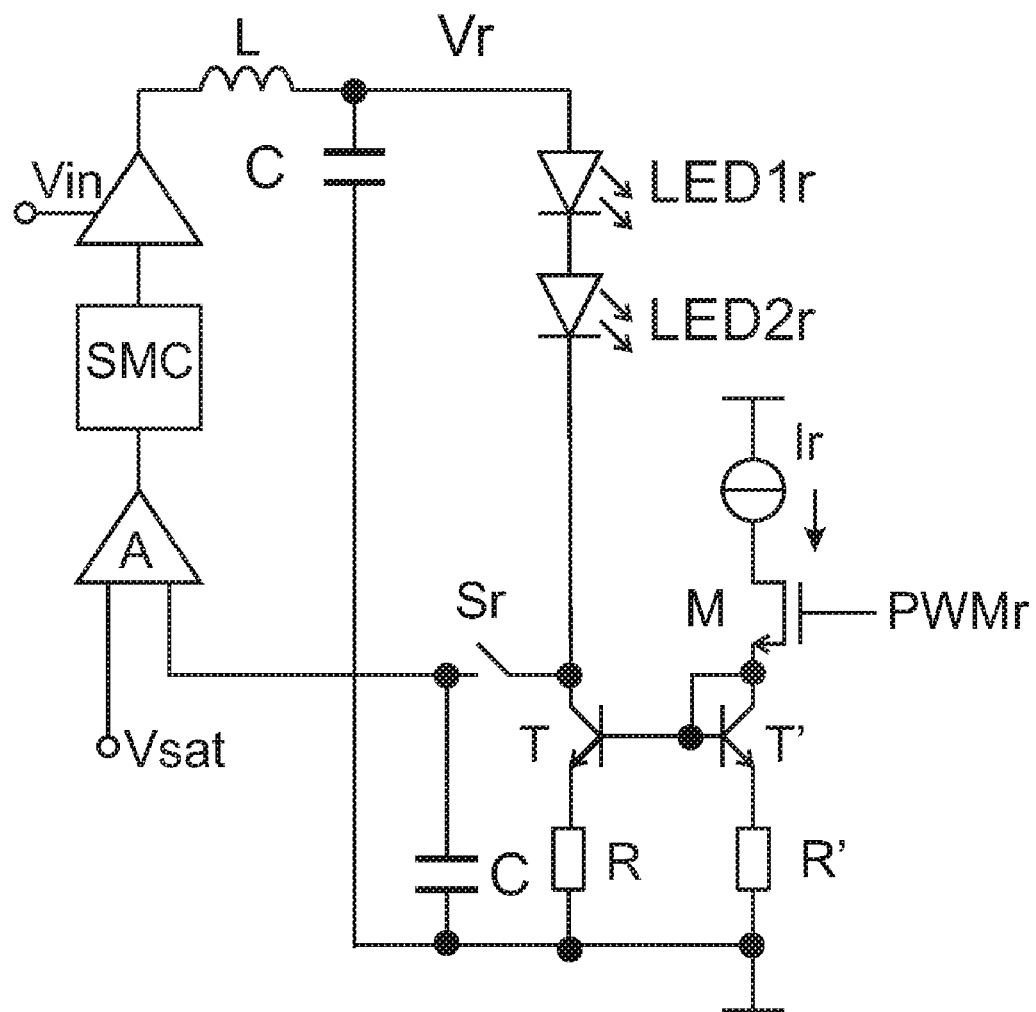
FIG. 5 shows a simplified schematic of a third embodiment of the present invention.

FIG. 5 shows a simplified schematic of a second embodiment of the present invention. The basic control mechanism of the circuit shown in FIG. 5 is similar to the mechanism described with respect to FIG. 3. However, the components are now depicted in more detail. Accordingly, there is a sampler Sr to sample the voltage Vr at the collector of transistor T. The voltage level at the collector is supplied to an amplifier A to compare the sampled voltage level with a predefined voltage level Vsat. The output signal of the amplifier is coupled to a control unit SMC being adapted to control the switch mode of the switch mode power converter that generates Vr from an input voltage Vin. The switch mode supply voltage is controlled such that the measured output voltage of the current source corresponds to a reference value that is equal to a minimum value Vsat. At Vsat the linear current source is—including a specific margin—at its edge of saturation. The sampler Sr is switched synchronously to the PWM signal. Accordingly, the sampler Sr is in a locked state, such that the control loop is open and the duty cycle of the switch mode converter is fixed to supply a constant Vr. If the analog settle times are small enough to recover from the switching, the sampler can be implemented in the switch-mode controller by fixing the duty cycle. The advantage of having the sampler immediately at the output node of the current source resides in the minimal amount of nodes in the circuits to be driven to their limits for the off state of the current source. It is also possible to control the output voltage of the current source to the same level as the input voltage of the mirror. This provides an improved thermal matching of the power components, and therefore in an enhanced current mirror accuracy in case the mirror has a current gain of 1.

FIG. 6 shows a simplified schematic of an aspect of the present invention. This aspect of the present invention provides a switch mode current source for controlling the current through the LEDs LED1r, LED2r. The current source includes an inductor Lr, a fly back diode Dr as well as a control switch transistor Mr and a resistor Rr. In response to the control and dimming signal PWM/Control, the MOSFET transistor Mr switches the current on and off, thereby controlling the voltage Vr and the current through the LEDs. FIG. 6 shows a self-oscillating buck converter. During the primary stroke, i.e. while the current through inductor Lr increases, the switch Mr is conducting. Upon detection of the peak-current, the switch Mr is turned off. During the secondary stroke, a decreasing current flows through inductor Lr, while the current is circulating via diode Dr, and LEDs LED1r, LED2r. When the current through the coil Lr is sensed to be zero, the switch transistor Mr is turned on. A current of zero is detected by measuring either the current through the coil Lr or the voltage at the LED string side of the coil, where a swap of polarity relative to an input voltage can be detected. Another approach is to measure the voltage at the output of control switch transistor Mr known as valley detection. The sensing voltage Vs, which is indicative of the voltage across control switch Mr, the coil Lr, and sensing resistor Rr is measured between Lr and the light emitting diode LED2r. The different aspects of the present invention as explained throughout the present description are all susceptible to the switch mode current source as shown in FIG. 6. The switching mechanism of the switch Mr must take account of the timing of the control mechanism and vice versa. According to the circuit shown in FIG. 6, the supply voltage Vr is adapted such that the voltage across the string of LEDs LEDstr comes close to Vr, which means in different words that the difference between Vr and the voltage across the string of light emitting diodes LEDstr, i.e. the voltage across Lr, Mr, and Rr is controlled to be closer to zero, only satisfying the minimum requirements for proper operation. In fact, The advantage of minimizing the voltage across the "current source", i.e. the respective parts thereof, for a switched-mode converter is that smaller inductors Lr can be used, which provides a cost benefit.

Figure 7:
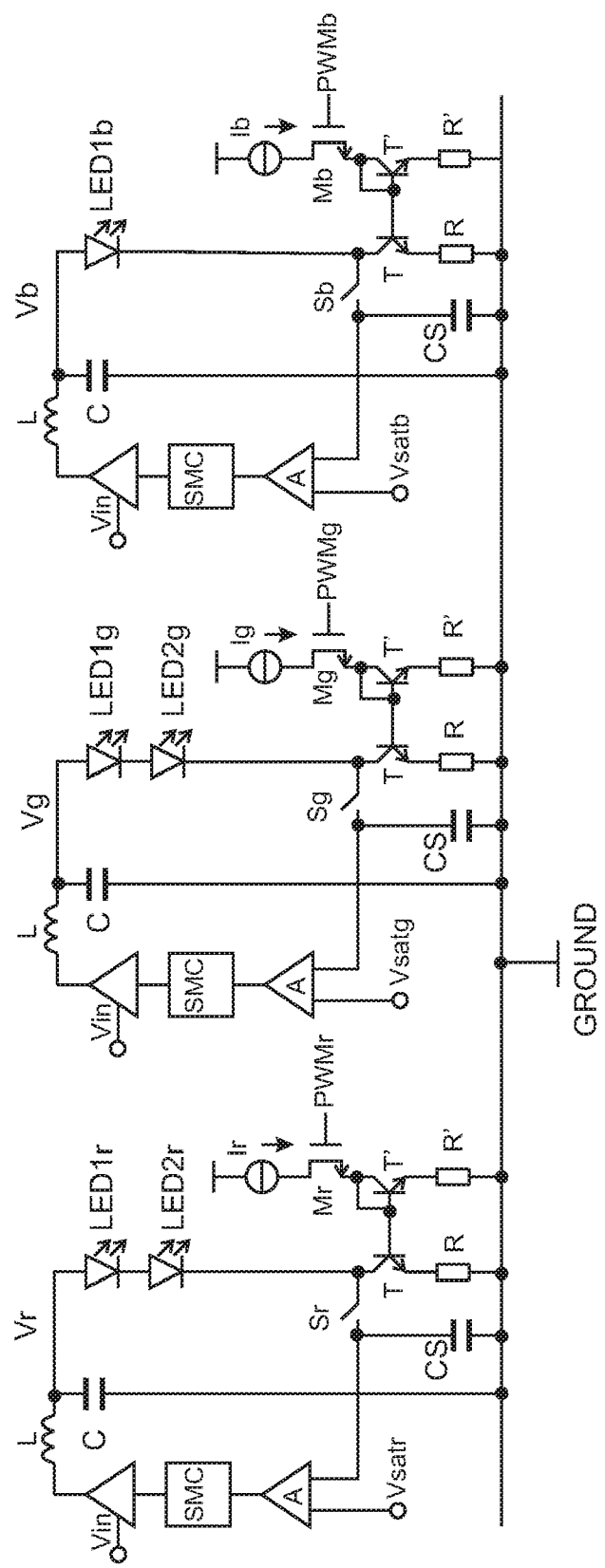
FIG. 7 shows a simplified schematic of a fifth embodiment of the present invention.

FIG. 7 shows a simplified schematic of a third embodiment of the present invention. According to FIG. 7, the circuit shown in FIG. 5 is applied to LEDs of different colors, as red, green and blue (RGB). This configuration is useful to provide different colors by the respective RGB values. Accordingly, the currents Ir, Ig, Ib are mirrored via current mirrors T, T' to supply the strings of LED1r, LED2r, LED1g, LED2g and LED1b. The dimming of the strings is achieved by the respective pulse width modulating signals PWMr, PWMg and PWMb per string. Each string has its own sampling switch Sr, Sg, and Sb and sampling capacitor Cs to provide the respective sensing value at an appropriate point of time for the control mechanism according to the present invention. Vr, Vg, and Vb are the respective supply voltages for each of the strings. The capacitors C and inductors L complete each of the switch mode power supplies per string. The strings have different configurations (numbers of LEDs, electrical characteristics etc.) and each string has its own saturation voltage value Vsatr, Vsatg, Vsatb. According, to the present invention the voltages Vr, Vg and Vb are controlled such that the voltage across the current sources (current mirrors) becomes minimum.

Figure 8:
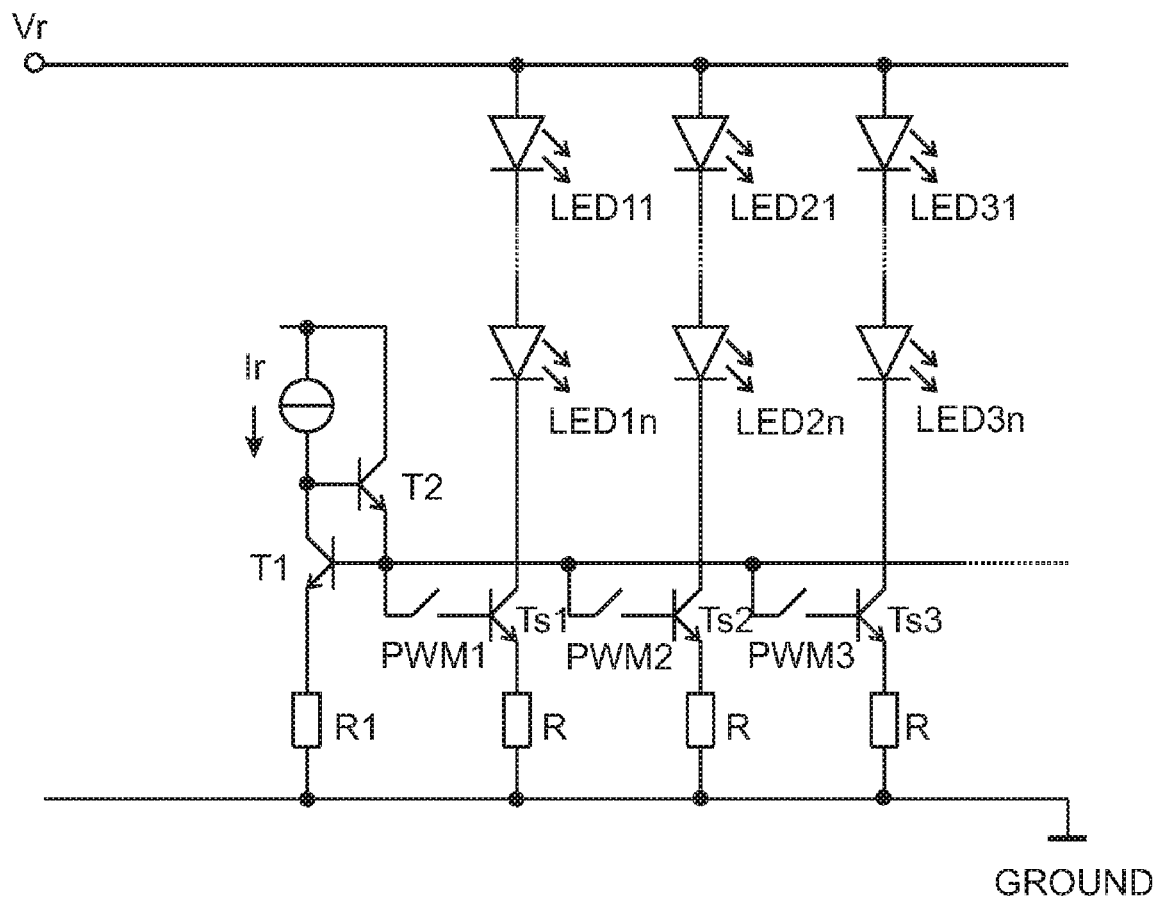
FIG. 8 shows a simplified schematic of a conventional circuitry for driving multiple LED strings by one voltage source.

FIG. 8 shows a simplified schematic of a conventional circuit for driving multiple LED strings by a single voltage supply. Accordingly, there is a constant voltage Vr being applied to the strings consisting of LED11 to LED1n, LED21 to LED2n, and LED31 to LED3n. Current source Ir supplies a current to transistor TI, which is supplied to switching transistors Ts1, Ts2, and Ts3. PWM1 to PWM3 are to perform the dimming of the strings.

Figure 9:
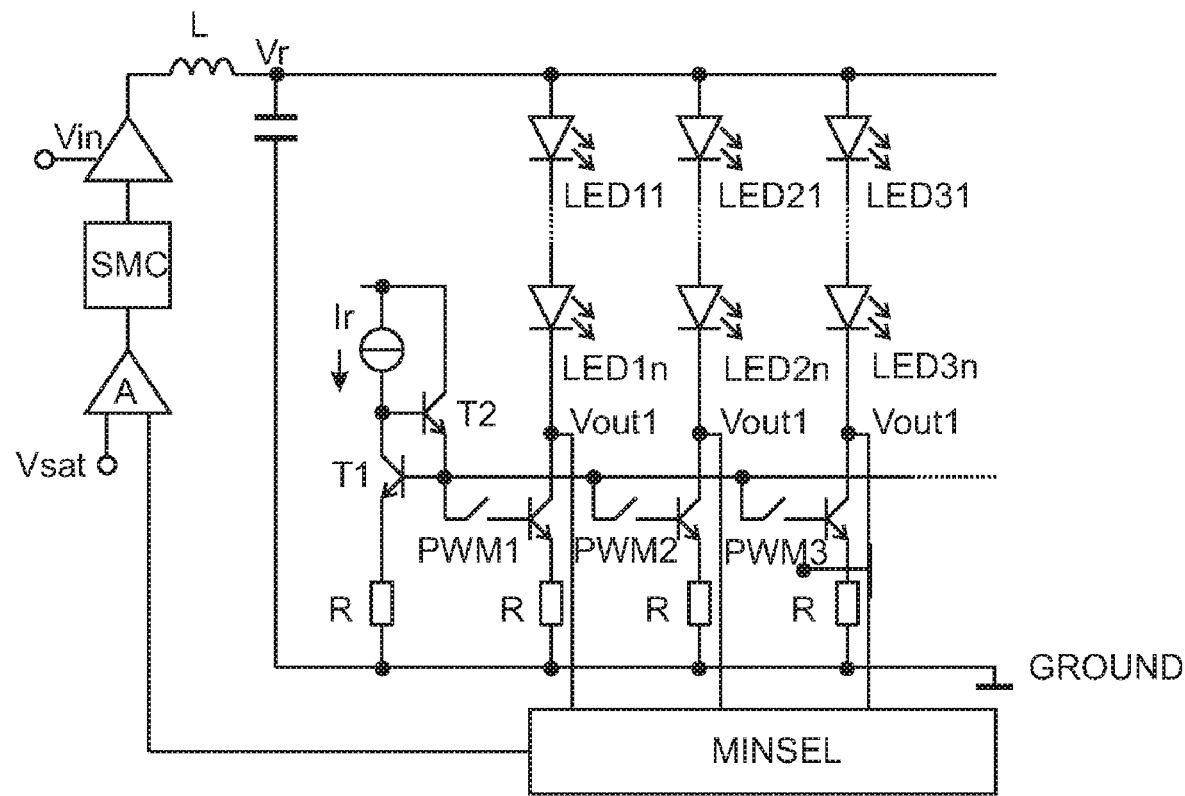
FIG. 9 shows a simplified schematic of a sixth embodiment of the present invention.

FIG. 9 shows a simplified schematic of a fourth embodiment of the present invention. Accordingly, in addition to the circuitry shown in FIG. 8, there is the error amplifier A, the control unit SMC and the switch-mode power supply including voltage source Vin, inductor L and capacitor C. Further, a minimum selector MINSEL is provided, which supplies a minimum signal to the amplifier A to compare the output signal of MINSEL with a minimum saturation voltage Vsat, and to supply the resulting signal to the switch mode controller SMC. SMC is provided to control the switch mode power converter. The shown configuration implements a power converter in order to provide a voltage Vr to the multiple strings of LEDs. Controlling Vr according to the current source saturation criterion is now based on the minimum value that appears on the current source outputs being connected to Vr. The current source output voltages VOUT1, VOUT2, and VOUT3 differ due to different LED string temperatures, zero-hour forward-voltage spread and ageing. Accordingly, the voltage Vr is controlled by the switch mode controller SMC such that the minimum output voltage, i.e. the minimum of VOUT1, VOUT2, and VOUT3 becomes close or equal to Vsat.

Figure 10:
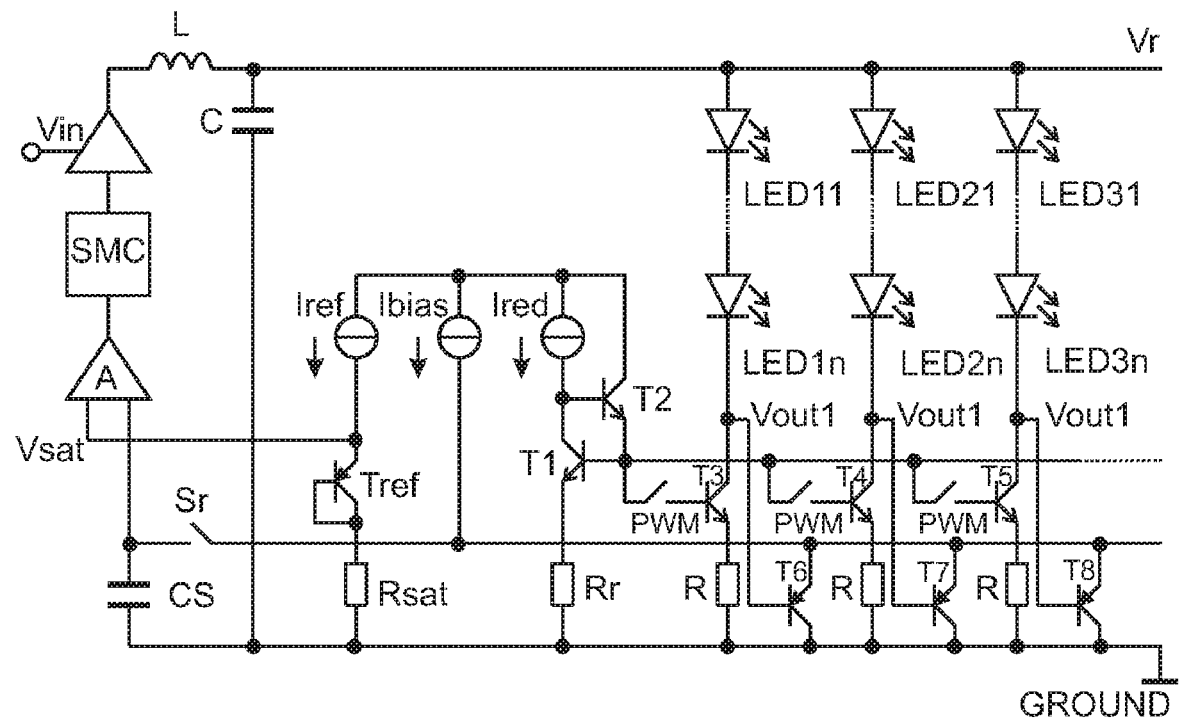
FIG. 10 shows a simplified schematic of a seventh embodiment of the present invention.

FIG. 10 shows a simplified schematic of a fifth embodiment of the present invention. The circuit shown in FIG. 10 implements basically the functions of the circuit shown in FIG. 9. FIG. 10 shows the minimum selector in more detail. The configuration includes a voltage converter in order to provide a supply voltage Vr, which is controlled by a switch mode controlled current source. Vr is adjusted such that the minimum output voltage VOUT1, VOUT2, VOUT3 is controlled to equal Vsat. Vsat is adjusted by a current source Iref passing a current through the transistor Tref and the resistor Rsat. The sampler Sr samples the voltage on the common PNP line being coupled to the emitters of PNP transistors T6, T7, and T8. Transistors T3, T4, and T5 are used as before in order to switch the current according to a pulse width modulated signal PWM. The wired-OR PNP line serves as a minimum selector. The common source of the PNP line is compared to Vsat in the amplifier A. Vsat is generated by matched currents Iref and Ibias, matched PNP transistors and a matched resistor Rsat corresponding to the degeneration resistor of the current sources. Principally, the voltage across Rsat represents the minimum current source output voltage being the sum of degeneration voltage, VCEsat (saturation voltage between collector and emitter of the NPN transistors) including a specific margin. The configuration is adapted such that the PWM on/off switching of the current sources does not interact with the control loop. The output voltage raises, when the current source is turned off and has therefore no influence on the minimum detector. Further, capacitive effects of turning off the minimum selector will be filtered by the low pass characteristic of the switch mode controller. If all current sources are turned off, an additional breaking means is provided, in order to break the control loop and keep the duty cycle of the switch mode controller fix.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. A single LED may be replaced by multiple LEDs, in particular a string thereof. A light emitting diode may also be another light emitting semiconductor device as long as the aspects of the present invention are applicable. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An electronic device for driving a light emitting semiconductor device, the electronic device comprising:
  a feedback port configured and arranged for receiving a sensing value;
  an output port configured and arranged to supplying the light emitting device in response to a current source; and
  a controller circuit, electrically decoupled or isolated from the light emitting semiconductor device, configured and arranged for controlling a switch-mode power supply for supplying the light emitting semiconductor device, via the output port, in response to the sensing value received by the controller, via the feedback port, which is indicative of a voltage across the current source for determining a current through the light emitting semiconductor device, wherein the switch-mode power supply is controlled such that the voltage across the current source is maintained at a minimum level as necessary for device operation.

2. The electronic device according to claim 1, wherein the current source is a switched current source or a linear current source.

3. The electronic device according to claim 1, wherein the controller provides signals to switch the current through the light emitting semiconductor device on and off, in particular by a pulse width modulated signal.

4. The electronic device according to claim 1, wherein the controller is further adapted to control timing of a sampling for sampling the sensing value, which is indicative of the voltage across the current source, such that sampling occurs when the current through the current source is turned on.

5. An electronic device for driving a light emitting semiconductor device, the electronic device comprising:
a feedback port configured and arranged for receiving a sensing value;
an output port configured and arranged to supplying the light emitting device in response to a current source; and
a controller circuit configured and arranged for controlling a switch-mode power supply for supplying the light emitting semiconductor device, via the output port, in response to the sensing value received by the controller, via the feedback port, which is indicative of a voltage across the current source for determining a current through the light emitting semiconductor device, wherein the switch-mode power supply is controlled such that the voltage across the current source is minimum, wherein the light emitting semiconductor device is a light emitting diode, the electronic device comprising further the switch-mode power supply, wherein the switch-mode power supply and the controller are adapted to control output voltage of the switch-mode supply with a control resolution of substantially less than the variation of a forward voltage of the light emitting diode to be driven.

6. The electronic device according to claim 1, wherein the light emitting semiconductor device is a light emitting diode, the electronic device being further adapted to provide pulse width modulating signals for the light emitting diode for dimming the light emitting diode.

7. The electronic device according to claim 6, wherein light emitting diodes are arranged in at least one string.

8. The electronic device according to claim 7, wherein the string of light emitting diodes are dimmed with a pulse width modulated signal.

9. An electronic device for driving a light emitting semiconductor device, the electronic device comprising:
a feedback port configured and arranged for receiving a sensing value;
an output port configured and arranged to supplying the light emitting device in response to a current source; and
a controller circuit configured and arranged for controlling a switch-mode power supply for supplying the light emitting semiconductor device, via the output port, in response to the sensing value received by the controller, via the feedback port, which is indicative of a voltage across the current source for determining a current through the light emitting semiconductor device
wherein the switch-mode power supply is controlled such that the voltage across the current source is minimum, including light emitting diodes arranged in at least one string, the electronic device being further adapted to provide pulse width modulating signals for the light emitting diode for dimming the light emitting diode; a plurality of current sources and a minimum selector, wherein the string of light emitting diodes is coupled to the plurality of current sources and the minimum selector is adapted to select the minimum voltage across the plurality of current sources, wherein the selected minimum voltage is used as a reference for controlling the switch-mode power supply.

10. An electronic device for driving a light emitting semiconductor device, the electronic device comprising:
a feedback port configured and arranged for receiving a sensing value;
an output port configured and arranged to supplying the light emitting device in response to a current source; and
a controller configured and arranged for controlling a switch-mode power supply for supplying the light emitting semiconductor device, via the output port, in response to the sensing value received by the controller, via the feedback port, which is indicative of a voltage across the current source for determining a current through the light emitting semiconductor device, wherein the switch-mode power supply is controlled such that the voltage across the current source is minimum, wherein the controller is electrically decoupled from the light emitting semiconductor devices, in particular by an inductive power converter or by an opto-coupler.

11. The electronic device according to claim 1, further comprising an input pin to receive the sensing value.

12. An electronic device for driving a light emitting semiconductor device, the electronic device comprising:
a current source being a linear current source including a transistor and configured and arranged to provide current through the light emitting semiconductor device, and
a controller adapted for controlling a switch-mode power supply for supplying the light emitting semiconductor device in response to a sensing value received by the controller which is indicative of a voltage across the current source for determining a current through the light emitting semiconductor device, wherein the switch-mode power supply is controlled such that the voltage across the current source is minimum,
wherein the controller is configured and arranged to control the switch-mode power supply to provide a supply voltage to the light emitting semiconductor device that maintains the voltage across the current source at a predefined level, the predefined level being about equal to a voltage at which the transistor is saturated.

13. An apparatus for supplying power to a light-emitting semiconductor device, the apparatus comprising:
a switch-mode power supply configured and arranged to supply power to the light-emitting semiconductor device;
a current source configured and arranged to pass current indicative of current through the light-emitting semiconductor device;
a controller, electrically decoupled or isolated from the light emitting semiconductor device, configured and arranged to control the switch-mode power supply to supply power to the light emitting semiconductor device, based upon a voltage drop across the current source, to control the voltage drop to correspond to a reference voltage drop across another current source.

14. An apparatus for supplying power to a light-emitting semiconductor device, the apparatus comprising:
a switch-mode power supply configured and arranged to supply power to the light-emitting semiconductor device;
a current source configured and arranged to pass current indicative of current through the light-emitting semiconductor device;

a controller configured and arranged to control the switch-mode power supply to supply power to the light emitting semiconductor device, based upon a voltage drop across the current source, to control the voltage drop to correspond to a reference voltage drop across another current source; and a plurality of the light-emitting semiconductor devices, a plurality of current sources, and a minimum selector circuit, the minimum selector circuit being configured and arranged to select another current source for determining the reference voltage, the controller being configured and arranged to control the voltage drop according to the voltage drop across the selected other current source.

15. The apparatus of claim 13, wherein the controller is configured and arranged to sample the reference voltage drop when the current through the current source is turned on.

16. An apparatus for supplying power to a light-emitting semiconductor device, the apparatus comprising:

a switch-mode power supply configured and arranged to supply power to the light-emitting semiconductor device;

a current source configured and arranged to pass current indicative of current through the light-emitting semiconductor device;

a controller configured and arranged to control the switch-mode power supply to supply power to the light emitting semiconductor device, based upon a voltage drop across the current source, to control the voltage drop to correspond to a reference voltage drop across another current source, wherein the switch-mode power supply and the controller are configured and arranged to provide an output voltage according to a control resolution of substantially less than a variation of a forward voltage of the light-emitting semiconductor device to be driven.

17. The apparatus of claim 13, wherein the controller is electrically decoupled from the light emitting semiconductor devices and the current source.

18. An apparatus for driving a plurality of light-emitting diodes, the apparatus comprising:

a plurality of current sources respectively connected to one of the light-emitting diodes, each current source being configured and arranged to pass current indicative of current flowing through the light-emitting diode to which the current source is connected; and a controller configured and arranged to control a switch-mode power supply for supplying power to the light-emitting diodes, based upon a voltage drop across one of the plurality of current sources that is lower than the voltage drop across all of the other current sources, and to generate pulse width modulating signals for controlling switches for dimming the light emitting diodes.

* * * * *